United States Patent [19]

Beaujean

[11] Patent Number: 4,814,925

[45] Date of Patent: Mar. 21, 1989

[54] SEALED CASSETTE CONTAINING RECORDING CARRIER TAPE

[75] Inventor: Joseph M. E. Beaujean, Grubbenvorst, Netherlands

[73] Assignee: Docdata N.V., Venlo, Netherlands

[21] Appl. No.: 193,216

[22] Filed: May 11, 1988

Related U.S. Application Data

[63] Continuation of Ser. No. 093,148, Sep. 3, 1987, abandoned, which is a continuation of Ser. No. 871,472, Jun. 6, 1986, abandoned.

[30] Foreign Application Priority Data

Jun. 12, 1985 [NL] Netherlands .................. 8501698

[51] Int. Cl.$^4$ ............................................ G11B 23/08
[52] U.S. Cl. ................................. 360/132; 369/272
[58] Field of Search .................... 360/132; 369/272

[56] References Cited

U.S. PATENT DOCUMENTS

| 3,553,391 | 1/1971 | Karnopp | 360/132 |
| 3,569,637 | 3/1971 | Esten | 360/132 |
| 3,692,956 | 9/1972 | Northrup | 360/132 |

FOREIGN PATENT DOCUMENTS 0026550 4/1981 European Pat. Off. .
2419657 11/1975 Fed. Rep. of Germany .

OTHER PUBLICATIONS

Patent Abstracts of Japan, vol. 6, No. 112, (p. 124).
Patents Abstracts of Japan, vol. 6, No. 145, (p. 132).
Patents Abstracts of Japan, vol. 9, No. 2, (p. 325).

*Primary Examiner*—Robert S. Tupper
*Attorney, Agent, or Firm*—Martin Smolowitz

[57] ABSTRACT

Cassette containing a recording carrier in tape form, and including means for transporting the recording carrier tape along an information transfer member forming part of the means for reading and/or writing and/or erasing the recording carrier tape. The cassette has an enclosure of hermetically sealed construction, and is filled with an inert low pressure gas which does not react chemically with the surface of the tape or with the surface of the tape guide means, if such means exists, such as hydrogen or helium gas at a pressure below 0.05 MPa.

8 Claims, 1 Drawing Sheet

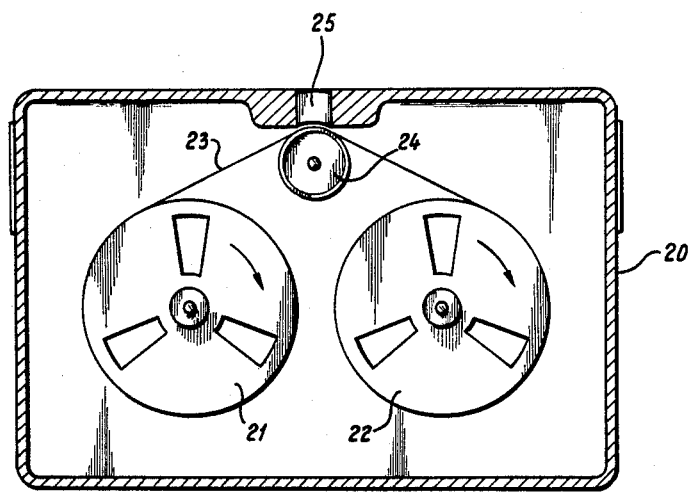

SEALED CASSETTE CONTAINING RECORDING CARRIER TAPE

This application is a continuation of application Ser. No. 093,148 filed Sept. 3, 1987 which in turn is a continuation of 871,472 filed June 6, 1986 now abandoned.

BACKGROUND OF THE INVENTION

This invention relates to a cassette containing are recording carrier in tape form, together with means for transporting the recording carrier tape along an information transfer member forming part of the means for reading and/or writing and/or erasing the recording carrier tape.

A cassette of this kind, particularly one containing an optical recording carrier in tape form, is known from Dutch Preliminary Published Patent Application No. 79.07289. The means for transporting the recording carrier tape consists in this case of two reels together with a reflector member over which the optical tape is guided during its transport from one reel to the other, in such a manner that the tape is brought into a defined position with respect to a window in the cassette wall, through which the light beam of an optical read/write head can reach the optical tape.

One problem which occurs in particular in the transporting of the information carrier tape in a cassette is the fact that the tape, viewed on a microscopic scale, does not run at a monotonous or uniform speed, but moves in jerks and jumps along the aforesaid window, so that the reading or writing process of the recording carrier tape is impaired. Another problem is that the tightness of the winding of the tape on the reels varies, so that there is no fixed relationship between the microscopic position of the tape and the position of the reels, even with uniform tractive force applied on the tape.

Although the present invention relates in particular to a cassette containing an optical recording carrier in tape form, the problems mentioned above also occur in cassettes containing magnetic recording carriers in tape form, such as audio and video cassettes.

SUMMARY OF THE INVENTION

The present invention provides a cassette having an enclosure containing a recording carrier tape which provides measures by which these disadvantages of prior cassette carrier tapes are eliminated or at least substantially reduced, and by which smooth and uniform transport of the carrier tape can be achieved. This object is attained with a cassette of the type defined above, in that the cassette has a hermetically sealed construction and is filled with a gas which does not react chemically with the surface of the tape or with the surface of the tape guide means, if such guide means exists. In particular, a dry non-reactive gas is used within the cassette enclosure. The uneven movement of the band or tape may be due to so-called stick-slip phenomena resulting from chemical reactions on the surface of the tape and/or the surface of the tape guide member, if such member exists. These stick-slip phenomena are effectively avoided by the measures according to the invention. It has been found that as the result of these measures, the recorder tape in the cassette runs considerably more smoothly and uniformly.

It is in particular preferably for the non-reactive gas used in the cassette enclosure to be an inert gas. Good results are obtained with hydrogen gas and helium and mixtures thereof.

It is also preferable for the gas in the cassette enclosure to be under a low or very low pressure, in other words for a vacuum pressure to be produced in the cassette, and for the residual gas in the cassette to consist of the non-reactive gas. It has been found that in this way a still further improvement can be achieved in respect of uniform movement of the tape, while the abovementioned problem of uneven tightness of winding on the reels of the cassette is to a great extent overcome by this low pressure inert gas means. When a gas is present in the cassette, gas inclusions probably occur between the winding on a reel. By forming a vacuum pressure in the cassette and by bringing the gas in the cassette to a pressure lower than 0.05 MPa, and preferably to a pressure lower than 0.01 MPa, the influence of these gas inclusions on the tape windings is eliminated.

In one form of construction of the cassette, the recording carrier tape is provided with a magnetizable recording medium, and the aforesaid information transfer member consists of at least one magnetic head mounted in the cassette, while hermetically sealed electric lead-in means connected to the magnetic head are disposed in the wall of the cassette.

In another embodiment of the invention, the recording carrier tape is provided with an optical read/write recording medium and the aforesaid information transfer member is composed of an optically transparent window provided in the cassette wall.

The invention relates not only to a cassette containing a recording carrier in tape form, but also to a cassette which is intended to contain a recording carrier tape and then to be hermetically sealed and filled with a non-reactive gas. The scope of the invention also extends to the still empty cassette especially intended for this purpose.

DESCRIPTION OF INVENTION

The drawing show schematically a section of a cassette enclosure or holder containing an optical information carrier in tape form in accordance with the invention. The holder 20 is shown in a cross-sectional view, and therefore only the side walls through which the section view is taken can be seen in the drawing. It will however be clear that the holder 20 is also provided with to an bottom walls fastened hermetically and sealingly to the closed side walls. In the holder two shafts 26 and 27 are fastened for example to the bottom plate or wall of the cassette. The reels 21 and 22 are mounted for rotation about these two shafts. The optical information carrier tape 23 runs off the supply reel 21 via a guide or pressing member 24 to the other reel 22. The pressing member 24 is located in front of a translucent or optically transparent window 25, which is provided in the wall of the cassette 20 and is hermetically sealed therein. That part of the optical information carrier tape 23 which is located on the pressing member 24 can be seen through this window 25 by an optical read/write head (not shown). The pressing member 24 may be in the form of a rotatably mounted wheel, or else in the form of a non-rotatable sliding member.

I claim:

1. A cassette containing a recording carrier in tape form, together with means for transporting the recording carrier tape along an information transfer member forming part of means for reading and/or writing and/or erasing the recording carrier tape, wherein the cassette includes an enclosure having walls of hermetically sealed construction, and the enclosure is filled with a dry inert gas which does not react chemically with the surface of the carrier tape or with the surface of a tape guide means provided in the enclosure, said gas having a pressure lower than 0.05 MPa.

2. A cassette according to claim 1, wherein the gas consists substantially of hydrogen.

3. A cassette according to claim 1, wherein the gas consists substantially of helium.

4. A cassette according to claim 1, wherein the gas present in the enclosure has a pressure lower than 0.01 MPa.

5. A cassette according to claim 1, wherein the recording carrier tape is provided with a magnetizable recording medium, and said information transfer member consists of at least one magnetic head mounted in the cassette, and hermetically sealing electric lead-in means connected to the head are disposed in the enclosure wall of the cassette.

6. A cassette according to claim 1, wherein the recording carrier tape is provided with an optical read/write recording medium and that said information transfer member consists of an optically transparent window disposed in the cassette enclosure wall.

7. A cassette according to claim 1, wherein the gas consists of a mixture of hydrogen and helium.

8. A cassette containing a recording carrier in tape form and including means for transporting the recording carrier tape along an information transfer member forming part of a means for reading and/or writing and/or erasing the recording carrier tape, the cassette comprising:

an enclosure having walls of hermetically sealed construction, said enclosure having an optically transparent window located in one wall; and an optical information carrier tape provided on two reels located within said enclosure, said carrier tape being pressed against said window by a guide and pressing member located between the two reels and adjacent said window, wherein said enclosure is filled with a dry inert gas which does not react chemically with the carrier tape surface or with the tape guide surface provided in the enclosure, said gas having a pressure lower than about 0.05 MPa.

* * * * *